United States Patent [19]
Champagne

[11] Patent Number: 5,634,314
[45] Date of Patent: Jun. 3, 1997

[54] TRIM CLIP FOR SIDING

[75] Inventor: Wendel J. Champagne, Tomball, Tex.

[73] Assignee: Tommy Wayne Hollis, Conroe, Tex.

[21] Appl. No.: 285,323

[22] Filed: Aug. 3, 1994

[51] Int. Cl.$^6$ .................................................. F16B 1/00
[52] U.S. Cl. ...................... 52/712; 52/716.8; 52/717.01; 52/747.1; 52/94; 52/520; 52/539; 52/548; 52/550
[58] Field of Search .............................. 52/520, 522, 523, 52/539, 546, 547, 548, 543, 550, 551, 712, 704, 716.7, 716.8, 717.01, 718.04, 747, 748, 94, 208, 204.599, 204.7, 745.21, 747.1, 748.1

[56] References Cited

U.S. PATENT DOCUMENTS

| | | |
|---|---|---|
| 876,843 | 1/1908 | Roever ............................ 52/547 X |
| 1,520,947 | 12/1924 | Harris ............................. 52/548 X |
| 1,730,653 | 10/1929 | Guertin ........................... 52/548 X |
| 1,941,216 | 12/1933 | McKeown ...................... 52/548 X |
| 2,060,739 | 11/1936 | Maddux .......................... 52/547 X |
| 2,164,712 | 7/1939 | Kirschbraun .................... 52/547 X |
| 2,227,939 | 1/1941 | Kridler ............................ 52/547 X |
| 2,565,610 | 8/1951 | Kinghorn ........................ 52/522 |
| 2,916,113 | 12/1959 | Lee ................................. 52/712 X |
| 3,438,168 | 4/1969 | Tiscuk ............................ 52/520 X |
| 3,512,222 | 5/1970 | Tinnerman ..................... 52/520 X |
| 3,757,483 | 9/1973 | Torbett ........................... 52/522 |
| 4,610,121 | 9/1986 | Schenach ....................... 52/520 |
| 4,854,101 | 8/1989 | Champagne. | |

*Primary Examiner*—Robert J. Canfield
*Attorney, Agent, or Firm*—John R. Casperson

[57] ABSTRACT

There is disclosed a mounting clip for joining siding panels. The clip has a first face and a second face. The clip is formed from a continuous metal strip. The continuous metal strip is bent generally into a FIG. 4 configuration and has an upright leg, a diagonal leg, and a angled leg. Each leg has a first end and a second end and a first face and a second face which correspond to the first face and the second face of the strip. The second end of the upright leg is connected to the first end of the diagonal leg by a first bight and the second end of the diagonal leg is connected to the first end of the angled leg by a second bight. The clip is especially well suited for joining a top out panel to a trim strip. In a preferred embodiment barbs and a point are provided to improve the connection between the topout panel and the clip.

14 Claims, 2 Drawing Sheets

TRIM CLIP FOR SIDING

BACKGROUND OF THE INVENTION

The invention relates to a clip for mounting siding. In one aspect, the invention relates to a clip that provides good holding power between a siding panel and a trim strip. In another aspect, the invention relates to a method for mounting a siding panel to a trim strip.

The current popular building materials for cladding both commercial and domestic buildings includes siding panels made of metal, such as aluminum, and plastics, such as vinyl. These panels are preformed with profiles simulating at least two rows of clapboard with each panel having top and bottom edges profiled for interlocking with adjacent panels. The panels also have surfaces which may be textured and coated with an almost permanent color finish. The panels are usually started on the building with a starter strip or bracket at the bottom edge of the wall to be covered. The top edge of the panel is secured to the building by inserting it into a trim strip which is an elongated preformed member of the same material as the siding panels and which defines a groove receiving the edge of the panel.

This type of mounting preserves the integrity of the panel, but is not sufficiently secure for all mounting situations. The normal method of improving the security of the mounting is to emboss the edge of the panel with a plurality of spaced apart crimps. These crimps can then be used to grip into the groove of the trim strip to hold the panel in place. While this provides an initial improvement in securing the panel, it is not a permanent fix in that the materials of the panel can relax or flow with time tending to resume their original shape. Thus an initially tight grip between a panel and the trim may, with time, become sufficiently loose that the panel could be removed by certain weather conditions. U.S. Pat. No. 4,854,101 discloses a crimpable clip that may be used to join panels together. However, this clip requires a special tool and additional time to install.

It would seem that a viable alternative would be to simply nail the top of the panel into the trim strip by driving nails through both the trim and panel. This would undoubtedly secure the members together, but it would also void manufacturers warranties on the panels, be unsightly, and not permit the panels to move with respect to each other.

A mounting clip that is simple and easy to install and permits some degree of movement between the panels being joined would be very desirable.

OBJECTS OF THE INVENTION

It is an object of this invention to provide a clip for joining siding panels.

It is another object of this invention to provide such a clip that does not require special tools to install.

It is another object of this invention to provide a clip that is especially well adapted to join a topout panel to a trim strip, such as is located at wall tops and window and door bottoms.

It is another object of this invention to provide a method for mounting a top out panel on a wall being covered by siding.

SUMMARY OF THE INVENTION

In one embodiment of the invention, there is provided a mounting clip for joining siding panels. The clip has a first face and a second face. The clip is formed from a continuous metal strip. The continuous metal strip is bent generally into a FIG. 4 configuration and has an upright leg, a diagonal leg, and a angled leg. Each leg has a first end and a second end and a first face and a second face which correspond to the first face and the second face of the strip. The second end of the upright leg is connected to the first end of the diagonal leg by a first bight and the second end of the diagonal leg is connected to the first end of the angled leg by a second bight. The clip is especially well suited for joining a top out panel to a trim strip.

The clip can be used in a method for mounting a top-out panel to a wall portion being covered by rows of siding panels. A next-to top row panel is secured to the wall portion being covered. A trim strip is secured to the wall portion along an intended terminal edge of the siding panels. The trim strip has a receiving groove for receiving an upper end of the top-out panel. An inwardly turned edge on the trim strip defines an outer edge of the receiving groove. The inwardly turned edge extends toward the wall portion and forms an upwardly facing shoulder adjacent to the groove. A plurality of trim clips as described above are positioned in the groove of the trim strip. The trim clips are positioned so that the angled leg of the trim clip contacts the upwardly facing shoulder of the trim strip. The upper end of the top-out panel is positioned between the second end of the angled leg of the trim clip and the upright leg. When the clip is provided with points and/or barbs to engage the top out panel, the positioning of the top out panel in the trim strip is very reliable. Because the clip may easily slide into the groove of the trim strip and the top out panel may easily slide into the clip, no special tools are required for installation. The clip also permits movement between the panel and the trim strip.

DETAILED DESCRIPTION OF THE PREFERRED EMBODIMENTS

Figure 1:
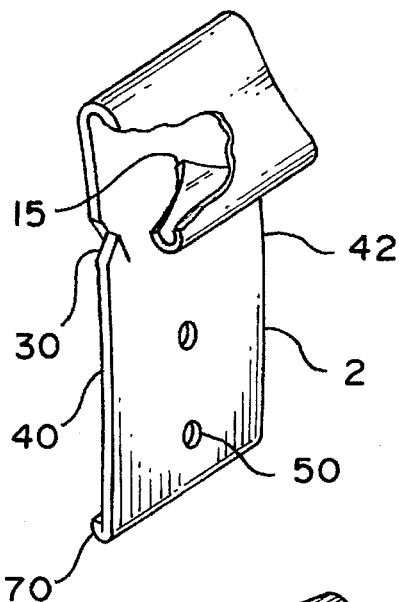
FIG. 1 is a pictorial representation of a clip embodying certain features of the present invention and having a portion broken away to show otherwise concealed details.
Figure 2:
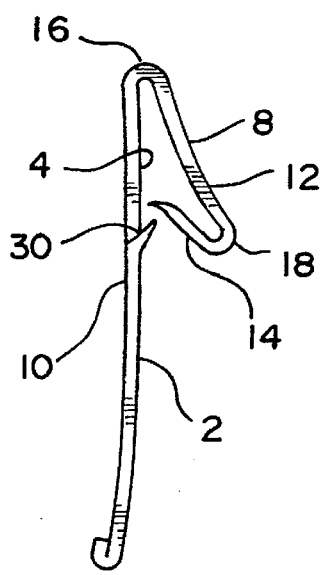
FIG. 2 is a side view of the clip of FIG. 1.
Figure 3:
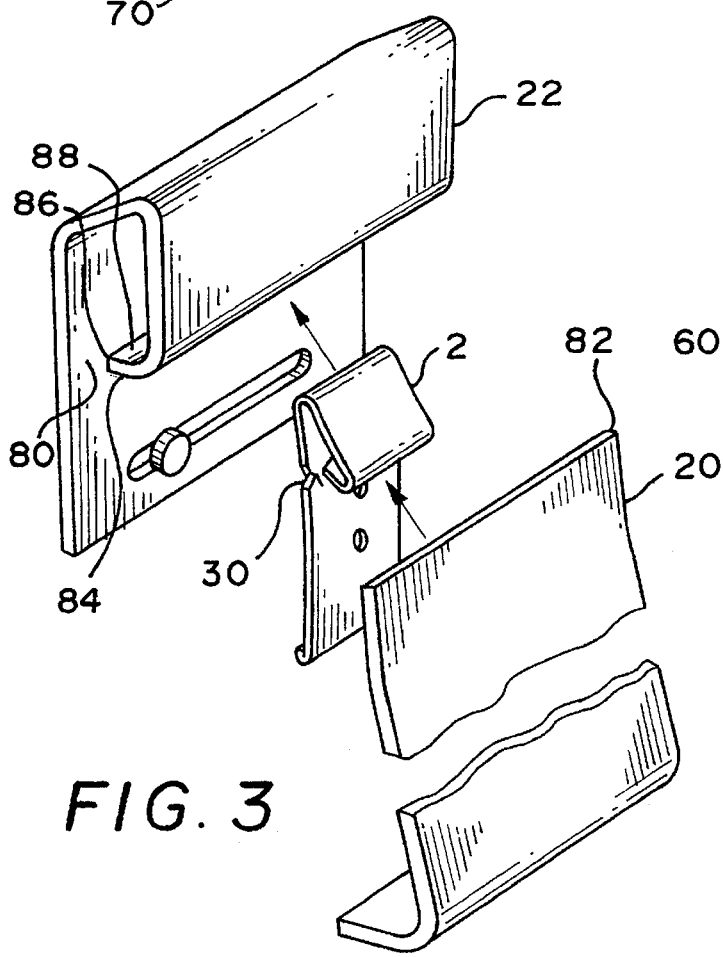
FIG. 3 is an exploded view illustrating use of the clip of FIG. 1.

In one embodiment of the invention, there is provided a mounting clip 2 for joining siding panels. The clip 2 has a first face 4 and a second face 8. The clip 2 is formed from a continuous metal strip. The continuous metal strip is bent generally into a FIG. 4 configuration (see FIG. 2) and has an upright leg 10, a diagonal leg 12, and a angled leg 14. Each leg has a first end and a second end and a first face and a second face which correspond to the first face and the second face of the strip. The second end of the upright leg is connected to the first end of the diagonal leg by a first bight 16 and the second end of the diagonal leg is connected to the first end of the angled leg by a second bight 18. The clip is especially well suited for joining a top out panel 20 to a trim strip 22.

Generally speaking, the first face of the upright leg 10 faces the first face of the diagonal leg 12. The first face of the angled leg 14 faces the first face of the generally diagonal leg 12. The mounting clip 2 preferably further comprises at least one barb 30 protruding from the first face of the upright leg 10 at a position adjacent to the horizontal leg 14. The at least one barb points toward the diagonal leg 12. The strip preferably comes to a point 15 at the second end of the angled leg 14.

The angled leg 14 may vary significantly in orientation from normal to the first face of the first leg 10. Usually, the angled leg 14 will angle back toward the first bight 16. The angle which the angled leg makes with the first face 10 will generally be in the range of from about 45 degrees to about 75 degrees. Preferably the point 15 at the second end of the angled leg points away from the first end of the upright leg and is bent more toward the first upright face, to be oriented at an angle in the range of about 30 degrees to about 60 degrees with respect to the first face of the upright leg.

For improved holding power, it is preferred that the at least one barb 30 comprises a first triangular barb 30 positioned adjacent to a first side edge 40 of the upright leg 10 and a second triangular barb 30 positioned adjacent to a second side edge 42 of the upright leg 10. The mounting clip is preferably formed by a stamping and bending operation, so it is most preferred that each barb be formed from a portion of the upright leg 10. Generally speaking, each barb will be oriented at an angle in the range of from about 30 degrees to about 60 degrees with respect to the first face of the upright leg 10. The point 15 at the second end of the angled leg 14, is preferably positioned closely adjacent to the first face of the upright leg 10 to provide greater biting force when the panel end is positioned in the clip.

For improved holding capabilities, the clip 2 can have at least one borehole 50 extending through the upright leg 10 from the first face to the second face for nailing to an underlying wall portion 60 to be covered by the siding. However, nailing is optional. The clip can simply be urged into the required position, where it will stay. To ease pressing the clip into position, the first end of the upright leg 10 can be provided with a rolled edge. Preferably, the edge 70 is rolled toward the second face of the upright leg 10.

It is important that the clip have adequate spring strength to perform its function. For vinyl siding, a mounting which is formed from stainless steel spring stock will provide good results. The blank stock can have a length in the range of about 1 inch to about 4 inches, preferably about 2 inches to about 3 inches, and a width in the range of about 0.25 inches to about 3 inches, preferably about 0.5 inches to about 1 inch, and a thickness in the range of from about 0.003 inches to about 0.020 inches, preferably about 0.009 inches to about 0.015 inches. An exemplary clip can be formed from 2.5× 0.5×0.012 inch stock.

The clip can be used in a method for mounting a top-out panel 20 to a wall portion 60 being covered by rows of siding panels. A next-to top row panel (not shown) is secured to the wall portion being covered. A trim strip 22 is secured to the wall portion 60 along an intended terminal edge of the siding panels. The trim strip has a receiving groove 80 for receiving an upper end 82 of the top-out panel 20. An inwardly turned edge 84 on the trim strip 22 defines an outer edge 86 of the receiving groove 80. The inwardly turned edge extends toward the wall portion 60 (see FIG. 4) and forms an upwardly facing shoulder 88 adjacent to the groove. A plurality of trim clips 2 as described above are positioned in the groove of the trim strip. The trim clips are positioned so that the angled leg 14 of the trim clip contacts upwardly facing shoulder 88 of the trim strip. The upper end 82 of the top-out panel is positioned between the second end of the angled leg 14 of the trim clip and the upright leg 10. When the clip is provided with points and/or barbs to engage the top out panel by snagging, the positioning of the top out panel in the trim strip is very reliable. Because the clip may easily slide in the groove of the trim strip and the top out panel may easily slide into the clip, no special tools are required for installation.

The trim clips may be clipped onto the upper end of the top out panel and the upper end of the top out panel having the trim clips clipped thereon slid into the groove. Alternatively, the trim clips may be affixed to the trim strip and the top out panel slid into the groove of the trim strip to be received by the previously positioned trim clips between the second end of the angled legs and the upright legs of the trim clips.

I claim:

1. A mounting clip for a siding panel, said mounting clip comprising a continuous metal strip having a first face and a second face, said continuous metal strip being bent generally in a FIG. 4 configuration to have an upright leg, a diagonal leg, and an angled leg, wherein each leg has a first end and a second end and a first face and a second face which correspond to the first face and the second face of the strip; and wherein the second end of the upright leg is connected to the first end of the diagonal leg by a first bight and the second end of the diagonal leg is connected to the first end of the angled leg by a second bight, wherein the first face of the upright leg faces the first face of the diagonal leg and the first face of the angled leg faces the first face of the generally diagonal leg, said mounting clip further comprising at least one barb protruding from the first face of the upright leg at a position adjacent to the angled leg, said at least one barb pointing toward the diagonal leg, wherein the at least one barb comprises a first triangular barb positioned adjacent to a first side edge of the upright leg and a second triangular barb positioned adjacent to a second side edge of the upright leg.

2. A mounting clip as in claim 1 wherein each barb is formed from a portion of the upright leg and is oriented at an angle in the range of from about 30 degrees to about 60 degrees with respect to the first face of the upright leg.

3. A mounting clip as in claim 1 wherein the strip comes to a point at the second end of the angled leg, wherein said point is positioned closely adjacent to the first face of the upright leg.

4. A mounting clip as in claim 1 further comprising at least one borehole extending through the upright leg from the first face to the second face.

5. A mounting clip as in claim 1 wherein the first end of the upright leg has a rolled edge which is rolled toward the second face of the upright leg.

6. A mounting clip as in claim 1 which is formed from stainless steel spring stock having a length in the range of about 1 inch to about 4 inches and a width in the range of about 0.25 inches to about 3 inches and a thickness in the range of from about 0.003 inches to about 0.020 inches.

7. A mounting clip as in claim 1 which is formed from stainless steel spring stock having a length in the range of about 2 inches to about 3 inches and a width in the range of about 0.5 inches to about 1 inch and a thickness in the range of from about 0.009 inches to about 0.015 inches.

8. A mounting clip as in claim 1 wherein the first face of the upright leg faces the first face of the diagonal leg and the first face of the angled leg faces the first face of the generally diagonal leg.

9. A mounting clip as in claim 3 wherein the point at the second end of the angled leg points away from the first end of the upright leg and is oriented at an angle in the range of about 30 degrees to about 60 degrees with respect to the first face of the upright leg.

Figure 4:
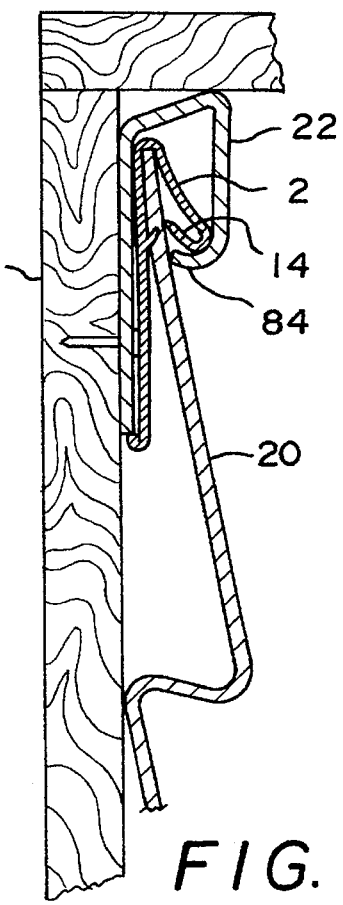
FIG. 4 is a side sectional view illustrating use of the clip of FIG. 1 to position a topout panel in a trim strip.
Figure 5:
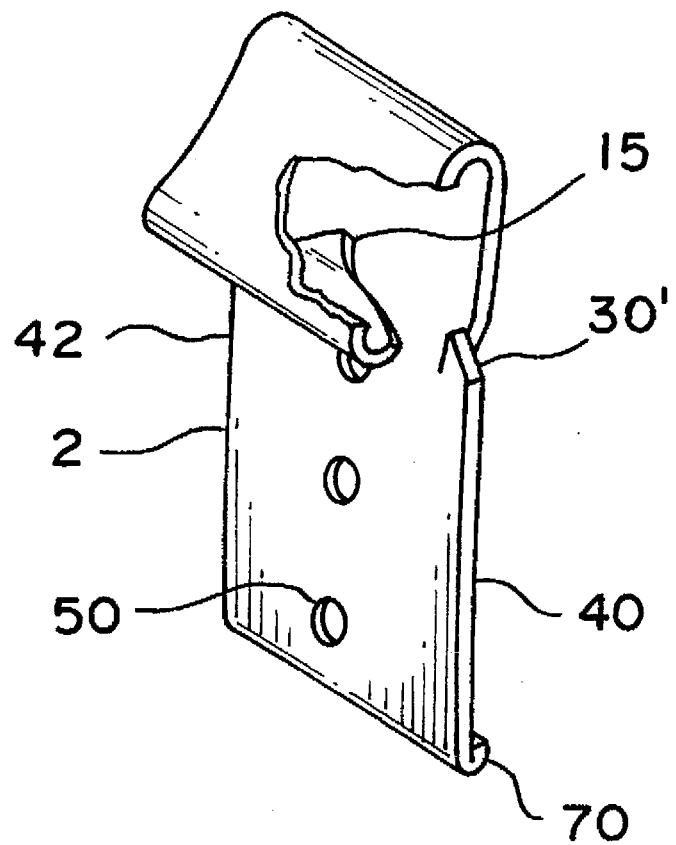
FIG. 5 is a reverse view of the device shown in FIG. 1.

10. A method for mounting a top-out panel to a wall portion being covered by rows of siding panels, said method comprising:

a. securing a next-to top row panel to the wall portion being covered;

b. securing a trim strip to the wall portion along an intended terminal edge of the siding panels, said trim strip having a receiving groove for receiving an upper end of the top-out panel and an inwardly turned edge defining an outer edge of the receiving groove which extends toward the wall portion and forms an upwardly facing shoulder adjacent to the groove;

c. positioning a plurality of trim clips in the groove of the trim strip, each such trim clip being formed from a continuous metal strip and having generally a FIG. 4 configuration with an upright leg, a diagonal leg, and an angled leg, wherein each leg has a first end and a second end and a first face and a second face, wherein the second end of the upright leg is connected to the first end of the diagonal leg by a first bight and the second end of the diagonal leg is connected to the first end of the angled leg by a second bight, each said trim clip being positioned so that the angled leg of the trim clip contacts the upwardly facing shoulder of the trim strip, and d. positioning an upper end of the top-out panel between the second end of the angled leg and the upright leg of each trim clip.

11. A method as in claim 10 wherein, for each trim clip, the first face of the upright leg faces the first face of the diagonal leg and the first face of the angled leg faces the first face of the generally diagonal leg and the trim clip comes to a point at the second end of the angled leg, said method further comprising snagging the top out panel on the point of each trim clip.

12. A method as in claim 10 wherein, for each trim clip the first face of the upright leg faces the first face of the diagonal leg and the first face of the angled leg faces the first face of the generally diagonal leg, each said trim clip further comprising at least one barb protruding from the first face of the upright leg at a position adjacent to the angled leg, said at least one barb pointing toward the diagonal leg, said method further comprising snagging the top out panel on the at least one barb of each trim clip.

13. A method as in claim 10 further comprising clipping the trim clips onto the upper end of the top out panel and sliding the upper end of the top out panel having the trim clips clipped thereon into the groove.

14. A method as in claim 10 further comprising affixing the trim clips in the groove of the trim strip and sliding the top out panel into the trim clips between the second end of the angled legs and the upright legs of the trim clips.

* * * * *